(12) United States Patent
Andrigo

(10) Patent No.: US 7,197,947 B2
(45) Date of Patent: Apr. 3, 2007

(54) ADJUSTABLE MOTOR VEHICLE SEAT HAVING MOUNTING PLATES FOR OCCUPANT CLASSIFICATION SYSTEM (OCS)

(75) Inventor: Gregory James Alexander Andrigo, Port Sydney (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 67 days.

(21) Appl. No.: 11/063,221

(22) Filed: Feb. 22, 2005

(65) Prior Publication Data

US 2006/0185447 A1  Aug. 24, 2006

(51) Int. Cl.
*G01L 1/26* (2006.01)
*G01L 1/22* (2006.01)

(52) U.S. Cl. .................................. 73/862.391
(58) Field of Classification Search ................. 73/862.391–862.474
See application file for complete search history.

(56) References Cited

U.S. PATENT DOCUMENTS

| | | | | |
|---|---|---|---|---|
| 5,014,958 A | * | 5/1991 | Harney | 248/394 |
| 5,018,696 A | * | 5/1991 | Siegrist | 248/429 |
| 5,207,480 A | * | 5/1993 | Johnson et al. | 297/344.1 |
| 6,069,325 A | * | 5/2000 | Aoki | 177/136 |
| 6,636,792 B2 | * | 10/2003 | Lichtinger et al. | 701/45 |
| 6,739,206 B2 | * | 5/2004 | Ishida | 73/862.391 |
| 6,748,814 B2 | * | 6/2004 | Ishida et al. | 73/862.391 |
| 2003/0051564 A1 | * | 3/2003 | Aoki | 73/862.391 |
| 2003/0154805 A1 | * | 8/2003 | Takafuji et al. | 73/862.391 |
| 2004/0237668 A1 | * | 12/2004 | Kobata et al. | 73/862.391 |

\* cited by examiner

*Primary Examiner*—Max Noori
(74) *Attorney, Agent, or Firm*—Richard M. Mescher; Porter Wright Morris & Arthur; Dean B. Watson

(57) ABSTRACT

A vehicle seat assembly includes a seat, seat mounting brackets for securing the seat to a vehicle structure, and a pair of laterally spaced apart track assemblies secured to the mounting brackets to selectively move the seat in a horizontal direction. A plurality of weight sensing devices are connected to the seat mounting brackets and a pair of mounting plates are supported by the weight sensing devices. A first pair of the weight sensing devices supports one of the pair of mounting plates and a second pair of the weight sensing devices supports the other of the pair of mounting plates. The weight sensing devices provide signals indicating occupancy of the seat. A seat belt is secured to at least one of the mounting plates so that loads of seat belt are transmitted through the mounting plates to the track assemblies and the mounting brackets.

18 Claims, 3 Drawing Sheets

ADJUSTABLE MOTOR VEHICLE SEAT HAVING MOUNTING PLATES FOR OCCUPANT CLASSIFICATION SYSTEM (OCS)

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to adjustable seat assemblies for motor vehicles and, more particularly, to such adjustable seat assemblies having occupant classification systems.

BACKGROUND OF THE INVENTION

Adjustable seat assemblies for motor vehicles typically provide for a seat to be moved or adjusted in a forward/rearward direction along a pair of spaced apart track assemblies. Each track assembly typically includes a first track member that is mounted to the vehicle and a second track member that is supported for movement relative to the first track member. The first and second track members are usually mounted in a horizontal configuration with bearing members located on sides of the first and second tracks. The seat is adjusted in the forward/rearward direction by sliding the second track members relative to the first track members. This is often referred to as a "two-way" adjustable seat. The adjustable seat assembly can also provide for the seat to be moved or adjusted in a upward/downward direction. The seat is usually adjusted in an upward/downward direction by raising/lowering the seat relative to the track assemblies. This is often referred to as a "four-way" adjustable seat. The adjustable seat assembly can additionally provide for the forward and rearward edges of the seat bottom to be moved or adjusted in an upward/downward direction independently of each other and/or provide for a seat back to be pivoted or adjusted in a forward/rearward direction relative to a seat bottom. These are often referred to as a "six-way" adjustable seat or an "eight-way" adjustable seat. Of course, any combination of the above-described seat adjustments can be utilized in particular adjustable motor vehicle seat.

A motor vehicle seat can have an occupant classification system (OCS) that senses weight to determine if a person is occupying the seat and, if so, the weight and consequently the size of the person occupying the seat. This information can be utilized so that a corresponding airbag is not triggered if the seat is unoccupied. Additionally, this information can be utilized so that the corresponding airbag is not triggered if the seat is occupied by a child or infant. Furthermore, this information can be utilized with corresponding airbags having variable filling volumes to adapt the filling volume to the size of the person occupying the seat and optimally restrain the person during an accident.

Typically, the OCS for an adjustable motor vehicle seat includes a plurality of weight sensing devices such as force sensors, stress or strain gauges, or the like mounted between the vertical lift assembly and the track members. A seatbelt is mounted to the vertical lift assembly so that the seatbelt is located above the weight sensing devices. Seatbelt loads travel down through the vertical lift assembly. During a crash, a vertical drive of the lift assembly can be subjected to as much as two times the force that it would experience in a standard design where the seatbelt is mounted to the track. As a result, at least the vertical drive, drive links and seat mounting brackets need to be considerably stronger to handle increased loads. Thus, a standard lift assembly cannot be utilized and a special lift assembly must be provided at added cost. Accordingly, there is a need in the art for an improved adjustable motor vehicle seat assembly having an occupant classification system.

SUMMARY OF THE INVENTION

The present invention provides an adjustable motor vehicle seat which overcomes at least some of the above-noted problems of the related art. According to the present invention, a vehicle seat assembly includes, in combination, a seat, seat mounting brackets for securing the seat to a vehicle structure, and a plurality of weight sensing devices connected to the seat mounting brackets. A pair of mounting plates are provided that are supported by the weight sensing devices. At least one of the mounting plates having a seat belt attachment. A vertical lift assembly is operably secured to the mounting plates and to the seat to selectively move the seat in a vertical direction relative to the mounting plates.

According to another aspect of the present invention, a vehicle seat assembly includes, in combination, a seat, seat mounting brackets for securing the seat to a vehicle structure and, a pair of laterally spaced apart track assemblies secured to the mounting brackets to selectively move the seat in a horizontal direction relative to the mounting brackets. A plurality of weight sensing devices are connected to the seat mounting brackets and a pair of mounting plates are supported by the weight sensing devices. The plurality of weight sensing devices includes a first pair of the weight sensing devices supporting one of the pair of mounting plates and a second pair of the weight sensing devices supporting the other of the pair of mounting plates. A seat belt is secured to at least one of the mounting plates and loads of seat belt are transmitted through the mounting plates to the track assemblies and the mounting brackets. A vertical lift assembly is operably secured to the mounting plates and to the seat to selectively move the seat in a vertical direction relative to the mounting plates.

According to yet another aspect of the present invention, a vehicle seat assembly includes, in combination, a seat, seat mounting brackets for securing the seat to a vehicle structure, and a pair of laterally spaced apart track assemblies secured to the mounting brackets to selectively move the seat in a horizontal direction relative to the mounting brackets. A plurality of weight sensing devices are connected to the seat mounting brackets and a pair of mounting plates are supported by the weight sensing devices. The plurality of weight sensing devices includes a first pair of the weight sensing devices supporting one of the pair of mounting plates and a second pair of the weight sensing devices supporting the other of the pair of mounting plates. The weight sensing devices provide signals indicating occupancy of the seat. A seat belt is secured to at least one of the mounting plates and loads of seat belt are transmitted through the mounting plates to the track assemblies and the mounting brackets. A vertical lift assembly is operably secured to the mounting plates and to the seat to selectively move the seat in a vertical direction relative to the mounting plates. The vertical lift assembly includes a pair of torque tubes extending between the mounting plates and into openings in the mounting plates so that the torque tubes are rotatably supported by the mounting plates.

From the foregoing disclosure and the following more detailed description of various preferred embodiments it will be apparent to those skilled in the art that the present invention provides a significant advance in the technology and art of adjustable motor vehicle seats. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
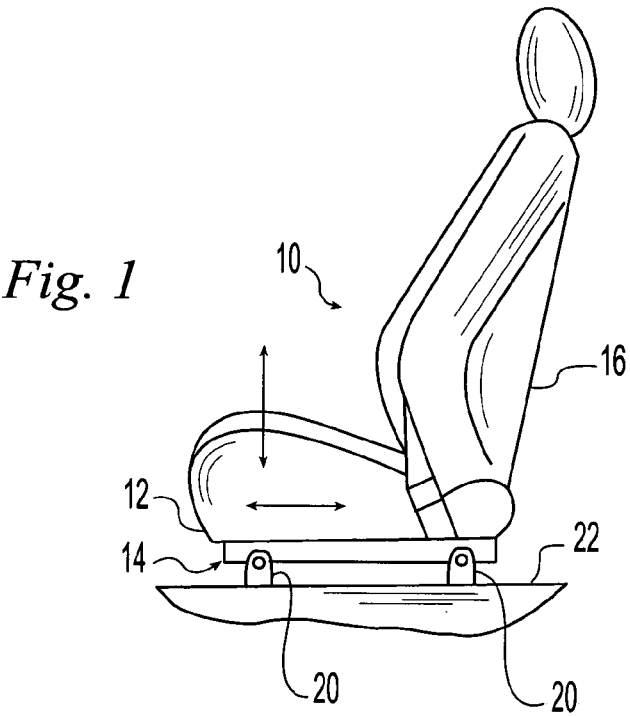
FIG. 1 is a side elevational view of an adjustable motor vehicle seat assembly having an adjustable track mounting system according to the present invention.

It should be understood that the appended drawings are not necessarily to scale, presenting a somewhat simplified representation of various preferred features illustrative of the basic principles of the invention. The specific design features of an adjustable motor vehicle seat as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the vehicle seat assembly illustrated in the drawings. In general, up or upward refers to an upward direction within the plane of the paper in FIG. 1 and down or downward refers to a, downward direction within the plane of the paper in FIG. 1. Also in general, fore or forward refers to a direction toward the front of the vehicle, that is, to the left within the plane of the paper in FIG. 1 and aft or rearward refers to a direction toward the rear of the vehicle, that is, to the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved adjustable motor vehicle seat disclosed herein. The following detailed discussion of various alternative and preferred embodiments will illustrate the general principles of the invention with reference to a preferred embodiment. Other embodiments suitable for other applications will be apparent to those skilled in the art given the benefit of this disclosure.

Referring now to the drawings, FIG. 1 schematically shows an adjustable motor vehicle seat assembly 10 according to a preferred embodiment of the present invention. The illustrated vehicle seat assembly 10 includes a seat bottom 12 which is mounted within a vehicle on a mounting assembly 14. A seat back 16 is supported with respect to the bottom 12. The illustrated seat assembly 10 is a "six-way" powered adjustable seat providing horizontal (fore/aft), vertical (up/down), and tilt adjustment. It is understood, however, that the present invention described herein can alternatively be utilized with a "four-way", "eight-way", or other powered adjustable seat, or with a "four-way", "six-way", "eight-way", or other manually adjustable seat.

As best shown in FIGS. 2 to 5, the mounting assembly 14 includes a pair of substantially parallel and laterally spaced apart track assemblies 18 which extend in a longitudinal or forward/rearward direction of the motor vehicle. The track assemblies 18 are mounted to a vehicle structure 22 such as a vehicle floor by mounting brackets 20.

Each track assembly 18 includes a first or fixed track 24 and a second or movable track 26. The illustrated first track 24 is a lower track and fixedly mounted to the vehicle structure 22 by the mounting brackets 20. The illustrated second track 26 is an upper track supported by the first track 24 so that the second track 26 selectively moved in a forward or rearward direction relative to the first track 24 to adjust the forward/rearward position of the seat bottom 12. It is noted that the track assemblies 18 can alternatively have any other suitable configuration such as, for example, the upper track can be fixed with the lower track being movable relative thereto or the tracks can be positioned laterally beside one another.

A horizontal drive assembly 28 having is operably connected to at least one of the track assemblies 18 to selectively move the second tracks 26 relative to the first tracks 24 to adjust the horizontal forward/rearward position of the seat bottom 12. The illustrated horizontal drive assembly 28 is an electrically powered assembly that includes an electric drive motor 30 operably connected to both of the second tracks 26. The drive motor 30 is preferably a D.C. motor. It is noted that the drive motor 30 can alternatively be operably connected to just one of the second tracks 26 and the horizontal drive assembly 28 can alternatively be a manually operated assembly rather than powered.

An occupant classification system (OCS) or occupant detecting system 32 is adapted to sense weight to determine if a person is occupying the seat assembly 10 and, if so, preferably the weight and consequently the size of the person occupying the seat assembly 10. The occupant detecting system 32 includes a plurality of weight sensing devices 34 such as, for example force sensors, stress or strain sensors or gauges, or the like configured to detect the weight of anyone or anything located on the seat bottom 12. Any suitable weight sensing devices 34 can be utilized which provides a signal which is representative of the weight or can be used to determine the weight. The weight sensing devices 34 are suitably connected to the occupant detecting system 32 to provide the signals thereto.

The illustrated occupant detecting system 32 includes four strain gauges 34. Each of the second tracks 26 has a pair of the strain gauges 34 secured thereto and horizontally movable therewith in a forward/rearward direction. The illustrated pairs of strain gauges 34 are spaced apart along the length of the second tracks 26 so that one of the pair is located near a forward end of the second track 26 and the other of the pair is located near rearward end of the second track 26. The illustrated strain gauges 34 are rigidly secured to the second tracks 26 via mounting brackets 36. The illustrated mounting brackets 36 have a horizontally extending main wall and a vertically extending side wall perpendicularly extending in an upward direction from the lateral outer edge of the main wall. The illustrated mounting bracket 36 also has flanges connecting the main and side walls to generally stiffen and/or strengthen the mounting bracket 36. The mounting brackets 36 are secured to the second tracks 26 by mechanical fasteners 38 extending through the main wall to the second tracks 26. The mounting brackets 36 are positioned and oriented so that the side walls are located laterally outward of the second tracks 26 and face laterally outward. The side walls are also provided with openings so that a shaft or engagement portions of the strain gauges 34 laterally extend through the openings. It is noted that the mounting brackets 36 can alternatively have other suitable configurations and the strain gauges 34 can alternatively be secured in other suitable manners. It is also noted that other suitable quantities of strain gauges 34 and other suitable locations for the strain gauges 34 can alternatively be utilized within the scope of the present invention.

A pair of OCS mounting brackets or plates 40 are provided on outer lateral sides of the mounting assembly 14. Each OCS mounting plate 40 is generally planar vertically oriented such that it extends in a forward/rearward direction laterally adjacent the outer sides of the track assemblies 18 at the outer sides of the side walls of the strain gauge mounting brackets 36. The forward and rearward ends of each of the OCS mounting plates 40 are provided with openings 42 to receive the engagement portions of the strain gauges 34 to connect the OCS mounting plates 40 to the strain gauges 34. The illustrated openings 42 form bearings or bearing surfaces for supporting the OCS mounting plates 40 thereon. Each OCS mounting plate 40 is connected to a cooperating pair of the strain gauges 34 so that each pair of the strain gauges 34 supports the associated OCS mounting plate 40. Mounted in this manner, the OCS mounting plates 40 are secured to the second tracks 26 and movable therewith. The rear end of each OCS mounting plate 40 is provided with a seat belt mounting point or opening 44 to which a seatbelt 46 is rigidly secured thereto. The illustrated seatbelt mounting point 44 is located slightly above and rearward of the rear opening 42 for the strain gauge 34. The forward and rearward ends of each of the OCS mounting plates 40 are provided with openings 48 to receive and connect a vertical lift assembly 50 as described in more detail herein after. The illustrated openings 48 form bearings or bearing surfaces for rotatably supporting torque tubes 52 of the vertical lift assembly 44 as described in more detail herein after. The illustrated openings 48 are located above and forward of the strain gauge openings 42. The illustrated OCS mounting plates 40 are generally planar except for stiffening flanges and the bearing surfaces 42, 48 but can alternatively have any other suitable configuration. The OCS mounting plates 40 can comprise any suitable material such as, for example, a steel or a structural plastic.

The vertical lift or drive assembly 50 is also mounted to and supported by the OCS mounting plates 40. The vertical lift assembly 50 selectively adjusts the vertical position of the seat bottom 12 relative to the track assemblies 18. While the vertical lift assembly 50 is illustrated with and preferably used in combination with the horizontal drive assembly 28, it should be understood that the vertical lift assembly 50 can also be used in a vehicle seat assembly that does not include horizontal adjustment.

The illustrated vertical lift assembly 50 includes a pair of parallel and spaced apart torque tubes 48 which laterally, and horizontally extend between the OCS mounting plates 40. Preferably, one torque tube 48 is located near the rearward portion of the seat assembly 10 and the other torque tube 48 is positioned near the forward portion of the seat assembly 10. The torque tubes 48 extend into and are rotationally supported by the openings 48 in the OCS mounting plates 40 so that the torque tubes 48 are rotatable about spaced apart, horizontal and laterally extending axes formed by the central longitudinal axes of the torque tubes 48. The torque tubes 48 are operably connected to a seat bottom pan or bracket 54 by linkages 56. The seat bottom is rigidly secured to the seat bottom bracket 54 in any suitable manner. The linkages 56 are adapted so that rotational or pivotable motion of the torque tubes 48 is translated into linear vertical motion of the seat bottom 12.

The torque tubes 48 selectively receive rotational movement from a pair electric drive motors 58. The vertical drive motors 58 are preferably D.C. motors. It is noted that alternatively a single vertical drive motor 58 be utilized and/or the vertical drive assembly 50 can alternatively be a manually operated assembly rather than powered. The illustrated drive motors 58 are secured to one of the second tracks 26 by a mounting bracket 60 which is secured to the second tracks 26 by mechanical fasteners. The motors 58 are operatively connected to drive spindles 62 for selective rotation of the drive spindles 62. Drive nuts 64 engage the drive spindles 62 and are connected to drive links 66 of the torque tubes 48 so that one of the drive motors 58 is operably connected to the forward torque tube 48 and the other one of the drive motors 58 is operably connected to the rearward torque tube 48. The drive links 66 are rigidly secured to the torque tubes 48 for rotational movement therewith. The drive nuts 64 are operably connected to the drive links 66 so that rotational motion of the drive spindles 62 caused by the drive motors 58 moves the drive nuts 64 along the drive spindles 62 to pivot the drive links 66 and the torque tubes 48 attached thereto. The rotational or pivotable motion of the torque tubes 48 is translated into linear vertical motion of the seat bottom 12 by the linkages 56 to raise or lower the seat bottom 12 as desired.

The illustrated vertical lift assembly 50 has separate motors 58 so that the forward or rearward portions of the seat bottom 12 can be independently raised or lowered to also provide tilt adjustment for the seat bottom 12. While the vertical lift assembly 50 is illustrated with and preferably used in combination with this tilt adjustment, it should be understood that the vertical lift assembly 50 can also be used in a seat assembly that does not include tilt adjustment.

Figure 6A:
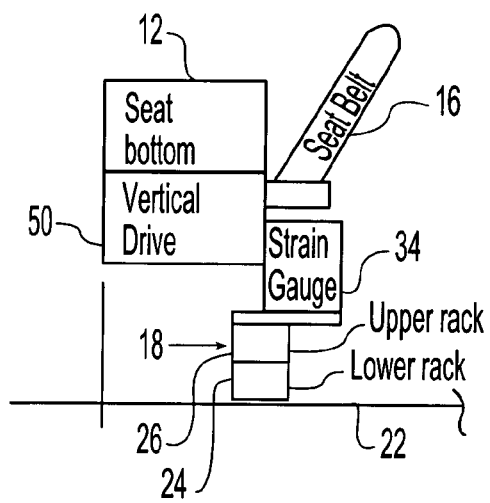
FIG. 6A is a schematic view showing a seatbelt load path for a prior art adjustable motor vehicle seat system.

As best shown in FIG. 6A, according to prior art seat assemblies, seat belt loads travel from the seat belt directly to the seat bottom pan or mounting bracket and then through the vertical lift assembly to the strain gauges and the strain gauge mounting brackets to the tracks. From the tracks, the seat belt loads are carried to the vehicle floor through the mounting brackets. Thus, the seat belt loads travel through the vertical lift assembly including the linkages, the torque tubes, the drive links, the drive nuts, the drive spindles. As a result, the axial load on the vertical lift assembly during a crash is twice the load that is experienced in comparable non-OCS designs where the seatbelt is attached directly to the tracks. This requires a much stronger and more expensive vertical lift assembly.

Figure 6B:
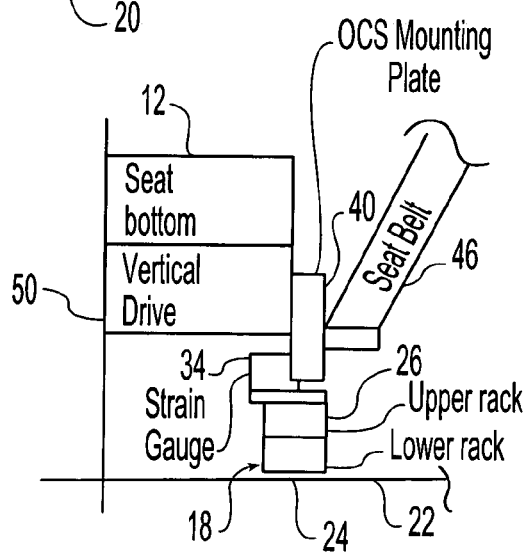
FIG. 6B is a schematic view similar to FIG. 6A but showing the load path for the adjustable motor vehicle seat of FIGS. 1 to 5.
Figure 2:
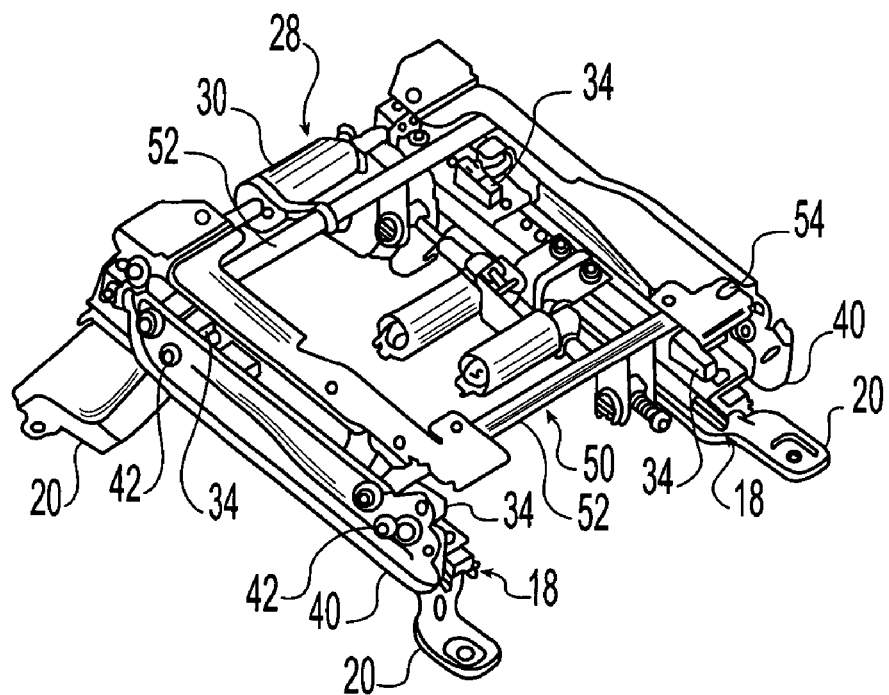
FIG. 2 is an enlarged perspective view of the adjustable mounting system of FIG. 1 with a seat removed for clarity.
Figure 3:
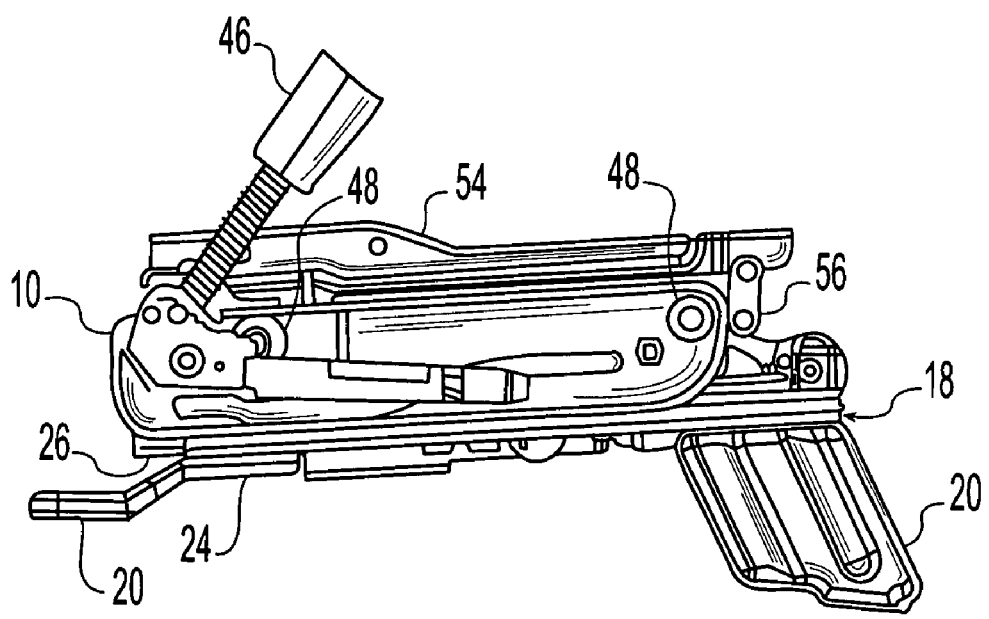
FIG. 3 is an enlarged side elevational view of the adjustable mounting system of FIGS. 1 and 2.
Figure 4:
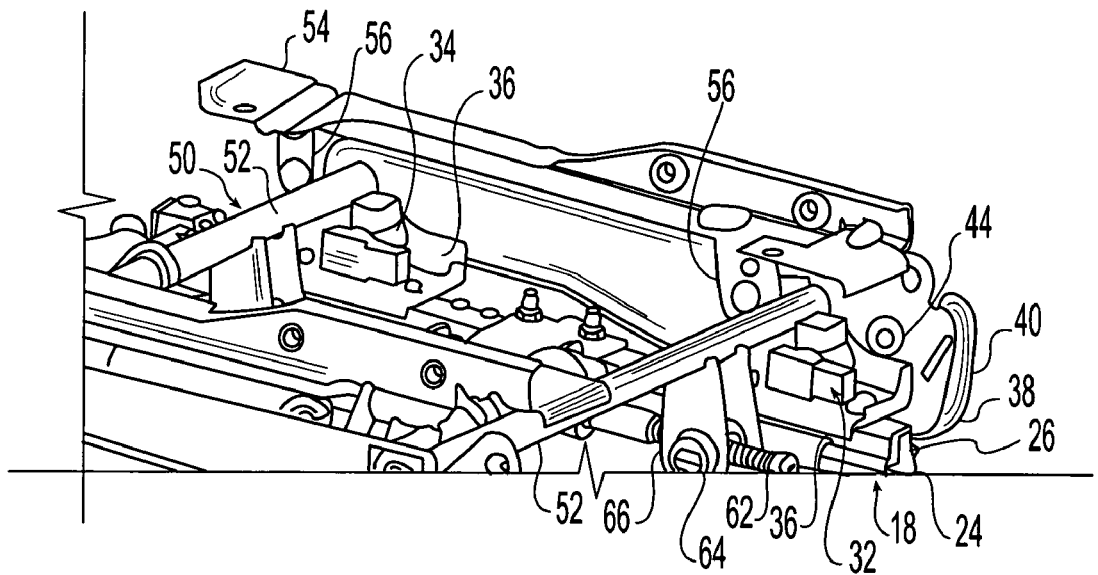
FIG. 4 is an enlarged, fragmented perspective view of a portion of the adjustable mounting system of FIG. 2.
Figure 5:
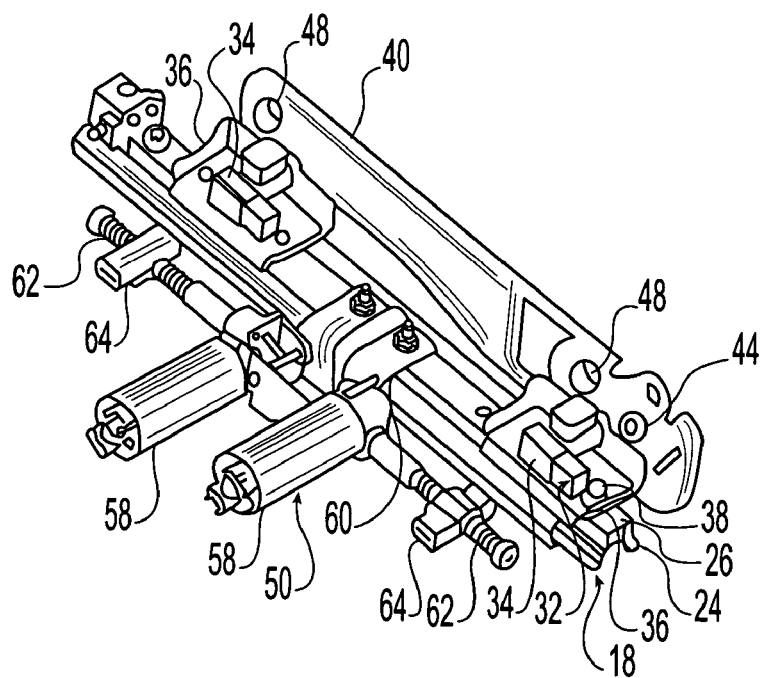
FIG. 5 is an enlarged, fragmented perspective view of a portion of the adjustable mounting system of FIG. 2 with a vertical lift assembly removed for clarity.

As best shown in FIG. 6B, according to the mounting assembly 14 of the present invention, seat belt loads travel from the seat belt 46 directly to the OCS mounting plates 40 and then through the strain gauges 34 and the strain gauge mounting brackets 36 to the tracks 18. From the tracks 18, the seat belt loads are carried to the vehicle structure 22 through the mounting brackets 20. Thus, the seat belt loads do not travel through the vertical lift assembly 50. As a result, axial loads on the vertical lift assembly 50 during a crash are no different than loads experienced by comparable non-OCS designs where the seatbelt 46 is attached directly to the tracks 18. Thus, a standard (vs. strengthened) vertical lift assembly 50 can be used at greatly reduced cost. It is also noted that the present invention allows for better packaging of the seat belts 46 because the lower mounting point 44 provided by the OCS mounting plates 40 is better from both styling and comfort viewpoints.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A vehicle seat assembly comprising, in combination:
a seat;
seat mounting brackets for securing the seat to a vehicle structure to prevent relative movement therebetween;
a pair of laterally spaced apart track assemblies to selectively move the seat in a horizontal direction relative to the seat mounting brackets and the vehicle structure;
wherein each of the track assemblies includes a first track secured to the seat mounting brackets to prevent relative movement therebetween and a second track member operably connected to the first track member to selectively move the second track member relative to the first track member in the horizontal direction;
a plurality of weight sensing devices connected to the second track members for movement in the horizontal direction with the second track members relative to the first track members and the seat mounting brackets;
a pair of mounting plates supported by the weight sensing devices and movable with the weight sensing devices and the second tracks in the horizontal direction relative to the first track members and the seat mounting brackets;
at least one of the mounting plates having a seat belt attachment;
a seat belt secured to the seat belt attachment;
a vertical lift assembly operably connecting the mounting plates and the seat to selectively move the seat in a vertical direction relative to the mounting plates;
wherein the vertical lift assembly is supported by the mounting plates and the vertical lift assembly and the seat are movable with the mounting plates, the weight sensing devices, and the second tracks in the horizontal direction relative to the first track members and the seat mounting brackets; and
wherein loads of the seat belt are transmitted from the seat belt attachment to the vehicle structure through the mounting plates, the weight sensing devices, the track assemblies, and the seat mounting brackets without being transmitted through the vertical lift assembly.

2. The vehicle seat assembly according to claim 1, wherein the weight sensing devices are strain gauges.

3. The vehicle seat assembly according to claim 1, wherein the plurality of weight sensing devices includes a first pair of the weight sensing devices supporting one of the pair of mounting plates and a second pair of the weight sensing devices supporting the other of the pair of mounting plates.

4. The vehicle seat assembly according to claim 1, wherein the mounting plates are generally planar and vertically oriented.

5. The vehicle seat assembly according to claim 1, wherein the track assemblies are located between the mounting brackets and the weight sensing devices.

6. The vehicle seat assembly according to claim 5, wherein the mounting plates are laterally spaced apart and located laterally outward of the track assemblies.

7. The vehicle seat assembly according to claim 1, wherein the weight sensing devices provide signals indicating occupancy of the seat.

8. The vehicle seat assembly according to claim 1, wherein the vertical lift assembly includes a pair of torque tubes extending between the mounting plates.

9. The vehicle seat assembly according to claim 8, wherein the torque tubes extend into openings in the mounting plates and are rotatably supported by the mounting plates.

10. A vehicle seat assembly comprising, in combination:
a seat;
seat mounting brackets for securing the seat to a vehicle structure to prevent relative movement therebetween;
a pair of laterally spaced apart track assemblies secured to the seat mounting brackets to selectively move the seat in a horizontal direction relative to the seat mounting brackets and the vehicle structure;
wherein each of the track assemblies includes a first track secured to the seat mounting brackets to prevent relative movement therebetween and a second track member operably connected to the first track member to selectively move the second track member relative to the first track member in the horizontal direction;
a plurality of weight sensing devices connected to the second track members for movement in the horizontal direction with the second track members relative to the first track members and the seat mounting brackets;
a pair of mounting plates supported by the weight sensing devices and movable with the weight sensing devices and the second tracks in the horizontal direction relative to the first track members and the seat mounting brackets;
wherein the plurality of weight sensing devices includes a first pair of the weight sensing devices supporting one of the pair of mounting plates and a second pair of the weight sensing devices supporting the other of the pair of mounting plates;

a seat belt secured to a seat belt attachment of at least one of the mounting plates;

a vertical lift assembly operably connecting the mounting plates and the seat to selectively move the seat in a vertical direction relative to the mounting plates;

wherein the vertical lift assembly is supported by the mounting plates and the vertical lift assembly and the seat are movable with the mounting plates, the weight sensing devices, and the second tracks in the horizontal direction relative to the first track members and the seat mounting brackets; and wherein loads of the seat belt are transmitted from the seat belt attachment to the vehicle structure through the mounting plates, the weight sensing devices, the track assemblies, and the seat mounting brackets without being transmitted through the vertical lift assembly.

11. The vehicle seat assembly according to claim 10, wherein the weight sensing devices are strain gauges.

12. The vehicle seat assembly according to claim 10, wherein the mounting plates are generally planar and vertically oriented.

13. The vehicle seat assembly according to claim 10, wherein the mounting plates are laterally spaced apart and located laterally outward of the track assemblies.

14. The vehicle seat assembly according to claim 10, wherein the weight sensing devices provide signals indicating occupancy of the seat.

15. The vehicle seat assembly according to claim 10, wherein the vertical lift assembly includes a pair of torque tubes extending between the mounting plates.

16. The vehicle seat assembly according to claim 15, wherein the torque tubes extend into openings in the mounting plates and are rotatably supported by the mounting plates.

17. A vehicle seat assembly comprising, in combination:

a seat;

seat mounting brackets for securing the seat to a vehicle structure to prevent relative movement therebetween;

a pair of laterally spaced apart track assemblies secured to the seat mounting brackets to selectively move the seat in a horizontal direction relative to the seat mounting brackets and the vehicle structure;

wherein each of the track assemblies includes a first track secured to the seat mounting brackets to prevent relative movement therebetween and a second track member operably connected to the first track member to selectively move the second track member relative to the first track member in the horizontal direction;

a plurality of weight sensing devices connected to the second track members for movement in the horizontal direction with the second track members relative to the first track members and the seat mounting brackets;

a pair of mounting plates supported by the weight sensing devices and movable with the weight sensing devices and the second tracks in the horizontal direction relative to the first track members and the seat mounting brackets;

wherein the plurality of weight sensing devices includes a first pair of the weight sensing devices supporting one of the pair of mounting plates and a second pair of the weight sensing devices supporting the other of the pair of mounting plates;

wherein the weight sensing devices provide signals indicating occupancy of the seat;

a seat belt is secured to a seat belt attachment of at least one of the mounting plates;

a vertical lift assembly operably connecting the mounting plates and the seat to selectively move the seat in a vertical direction relative to the mounting plates;

wherein the vertical lift assembly includes a pair of torque tubes extending between the mounting plates and into openings in the mounting plates so that the torque tubes are rotatably supported by the mounting plates;

wherein the vertical lift assembly is supported by the mounting plates and the vertical lift assembly and the seat are movable with the mounting plates, the weight sensing devices, and the second tracks in the horizontal direction relative to the first track members and the seat mounting brackets;

wherein loads of the seat belt are transmitted from the seat belt attachment to the vehicle structure through the mounting plates, the weight sensing devices, the track assemblies, and the seat mounting brackets without being transmitted through the vertical lift assembly.

18. The vehicle seat assembly according to claim 17, wherein the weight sensing devices are strain gauges.

* * * * *